2,941,891
NON-BURNISHING FLAT PAINT

Anthony J. Page, North Plainfield, N.J., assignor to Johns-Manville Corporation, New York, N.Y., a corporation of New York No Drawing. Filed June 17, 1957, Ser. No. 666,231

23 Claims. (Cl. 106—148)

This invention relates to an improved flat paint composition, particularly to a flat paint composition which does not have a tendency to rub up glossy and method of preparing the same. This application is a continuation-in-part of my copending application Serial No. 314,217, filed Oct. 10, 1952, now abandoned.

It is conventional practice to refer to various types of paint finishes by their specular gloss characteristics. These specular gloss characteristics of a paint are a function of the pigment value concentration of the paint. The latter is defined as the ratio of the volume of the pigment in the paint to the volume of total solids present therein.

With increasing pigment volumes, the specular gloss of the paint normally diminishes through the conventional classifications of high gloss, semi-gloss, eggshell, and flat paints. Flat paints, which may be considered to be those oil, oleo-resinous, or protein base paints having a 60° specular gloss less than approximately 10, normally have a pigment volume of the order of approximately 50 to 70%. This high pigment volume results in a paint film having a substantial amount of pigment extending through the surface of the film. Such paints are subject to a severe burnishing action when the film is abraded and the pigments extending through the film removed, flattened or crushed. Such burnishing results in shiny, glossy areas in an otherwise low gloss or matte painted surface. This objectionable characteristic of conventional flat paint films is particularly disadvantageous in the manufacture of painted structural materials which must receive mechanical treatments after painting and must be stacked upon each other for storage and shipping.

Accordingly, it is an object of this invention to provide a composition capable of forming a flat paint film which, during normal handling, is not susceptible of becoming shiny as the result of abrasion.

It is a further object of this invention to provide a paint composition having a 60° specular gloss less than 10 which will not rub up glossy.

It is a further and more specific object of this invention to provide an oil-modified, protein base, water thinned paint of a high pigment volume, which will retain its lusterless appearance without becoming glossy.

With the above objects and features in view, the invention consists of the improved paint composition and method of preparing the same which is hereinafter described and more particularly defined in the accompanying claims.

It has been found that a paint having a 60° specular gloss of less than 10, may be compounded to result in a film which will not become glossy when subjected to substantial abrasion by incorporating in conventional flat paint compositions a substantial amount of relatively coarse, irregular, fragmentary mineral particles. A flat paint containing the necessary amount of such relatively coarse irregular mineral particles retains its soft non-glossy appearance and is not subject to marring by the appearance of shiny spots as a result of scraping or abrading action thereon.

The irregular, fragmentary mineral particles employed in accordance with this invention must be used in such paint compositions in amount of from approximately 35–65% by weight of the total pigments employed in the composition and must have certain critical characteristics. As heretofore indicated, the particles must be of irregular, fragmentary shape as typified by but not necessarily limited to a rhombohedral cleavage characteristics of calcite. Flaky or laminar particles such as mica, etc. are not suitable for use in this invention, since they tend to settle in the paint with their faces parallel to the paint surface.

It is also necessary in carrying out this invention that the particles employed to prevent glossing of the paint film be relatively coarse as compared to conventional paint pigments and fillers. Such conventional pigments and fillers are generally desired to be sized substantially all through standard 325 mesh. The irregular, fragmentary particles employed in accordance with this invention are sized to allow retention of substantially all particles on standard 325 mesh, and preferably sized with a maximum of approximately 70% through 200 mesh, and substantially all passing 60 mesh. Preferably, no more than approximately 2% of the particles will be retained on 60 mesh, and no more than approximately 5% will pass 325 mesh.

In order to serve their desired function, it is further required that the irregular particles employed in accordance with this invention exhibit a Mohs hardness of at least approximately 3. Exemplary of fragmentary, irregular particles suitable for use in this invention and having the aforementioned characteristics are such materials as dry ground whiting, finely divided crystalline silica, etc.

This invention is particularly adapted to be used in the compounding of protein based, water thinned paints, particularly the more durable oil-modified protein based, water thinned paints. With such paints the problem of shiny spots on an otherwise flat paint surface is a major disadvantage which has decreased the attractiveness and uniform appearance of structural materials which are coated with such paints during the manufacturing procedure. The oil-modified protein based, water thinned paints are particularly adapted for use in factory coating methods due to their aqueous medium and the lack of manufacturing problems relating to safe disposal or volatilization of the vehicle. When such paints are used, however, and the painted panels are subjected to further manufacturing treatments such as cutting, beveling, stacking, etc., the decorative finish is often marred by shiny spots caused by abrasive and polishing action on the surface during such operations. When a protein based, water thinned paint, preferably oil-modified, is formed in accordance with this invention, such operations and the subsequent treatment of the painted panels during shipping fail to burnish the decorative surface.

As an example of the applicability of this invention to a protein based, water thinned paint employed in the manufacture of structural panels, a flat paint was formed having a composition of the following ingredients in the indicated approximate proportions of parts by weight:

Example I

| | |
|---|---|
| Protein (60 parts soybean flour and 40 parts casein) | 50 |
| Sodium hydroxide | 2 |
| Plasticizing oils (ethylene glycol ester rosin) | 33 |
| Prime pigment (lithopone) | 125 |
| Extender pigment (whiting) | 50 |
| Coloring pigment | 25 |
| Dry ground whiting (approximate size classification: 7% on 100 mesh, 35% on 200 mesh, remainder on 325 mesh) | 200 |
| Water | 500 |

The foregoing paint was coated and allowed to dry on a relatively large panel of insulating wood fiberboard, from which were cut, beveled, grooved and stacked a substantial number of smaller panels. These panels were then packaged and shipped in a conventional manner, and, upon inspection, the decorative surfaces of the panels were found to be in substantially the same condition as when the paint was initially dried. When compared to panels similiarly fabricated and coated with a flat protein based, water thinned paint composition excluding the relatively coarse irregular particles, it was immediately apparent that the panel having the surface coated with the aforementioned composition withstood the burnishing action of the subsequent processing steps without glossing in the manner exhibited by the comparison panels.

Further examples illustrating a typical protein based, water thinned paint composition of this invention in both white and ivory colors comprise the following ingredients in the indicated approximate proportions of parts by weight:

Example II

| | |
|---|---|
| Casein | 24 |
| Soya protein | 36 |
| Sodium hydroxide | 2 |
| Soya oil | 10 |
| Diethylene glycol ester of rosin | 30 |
| Diatomaceous silica | 105 |
| Titanium dioxide | 180 |
| Dry ground whiting (approximate size classification: 7% on 100 mesh, 35% on 200 mesh, remainder on 325 mesh) | 300 |
| Water | 495 |
| Fungicide | 2.5 |
| Paraformaldehyde | 2 |

Example III

| | |
|---|---|
| Casein | 24 |
| Soya protein | 36 |
| Sodium hydroxide | 2 |
| Soya oil | 10 |
| Diethylene glycol ester of rosin | 30 |
| Diatomaceous silica | 90 |
| Titanium dioxide | 105 |
| Ferric oxide | 5.5 |
| Whiting (dry ground marble) (approximate size classification: 7% on 100 mesh, 35% on 200 mesh, remainder on 325 mesh) | 345 |
| Water | 495 |
| Fungicide | 2.5 |
| Paraformaldehyde | 2 |

Two like samples comprising squares of wood fiberboard coated on one surface with protein based, water thinned flat paint were prepared for comparison. One sample, designated A, consisted of a square coated with a flat paint of the composition of Example II and the other, sample B, was coated with a protein based, water thinned flat paint like that of the example but with kaolin clay, a conventional paint extender pigment, substituted for the dry ground whiting. The unhandled painted surfaces of both samples exhibited a gloss value of 1 when tested with a Gardner 60° gloss meter. Each painted surface was then subjected to like treatment, 20 cycles or 40 strokes with a one-pound weighted dry brush as prescribed by the Gardner straight line washability test and its gloss value taken. Sample A, comprising a protein based, water thinned flat paint prepared in accordance with the invention registered a gloss value of 2 on the Gardner 60° gloss meter, whereas sample B, a like protein based, water thinned flat paint prepared without the relatively hard, irregular, fragmentary mineral particles, registered a gloss value of 11.

Suitable flat paints, that is flat paints having a 60° specular gloss of less than approximately 10 and a pigment volume of approximately 50 to 70%, may be prepared or manufactured by any conventional or appropriate procedure and non-burnishing characteristics imparted thereto by incorporating a substantial amount of relatively coarse and hard irregular mineral particles in addition to, or in place of an appropriate proportion of conventional paint pigments, particularly the extender pigments. For example, the foregoing paint composition may be prepared as follows: the casein and soya flour is dispersed in water at a temperature of at least about 85° F. to soften the casein-soybean flour mixture; caustic soda is added in solution and the protein-caustic-water mix is heated to approximately 140–148° F. with agitation to dissolve the protein; an antifoaming agent is preferably added along with the plasticizer, such as soya oil and diethylene glycol ester of rosin, while agitating to disperse the same; the pigments, including coloring pigments if used, and the relatively hard irregular, fragmentary mineral particles are added next; the mixture is then thoroughly mixed, diluted with water and a suitable fungicide and paraformaldehyde are preferably added and mixed in; finally the consistency of the paint composition is appropriately adjusted, for example, a viscosity of approximately 40–42 seconds at 105° F. with No. 4 Ford Cup is generally satisfactory for factory application.

As heretofore indicated, this invention has applicability to oil, oleo-resinous, or water thinned flat paints having a 60° specular gloss less than approximately 10 and a pigment volume of at least approximately 50% and particular applicability to protein based, water thinned paints, preferably oil-modified, having such a specular glass and a pigment volume of at least approximately 50% and preferably no more than approximately 70%. It is in such paint films of high pigment volume that the coarse, irregular, fragmentary mineral particles of this invention serve to prevent marring of, and shiny spots on the smooth appearing low gloss or matte paint film. The invention can be particularly advantageously used in paints of deep tone flat or matte paint compositions where the problem of polishing is most acute. While the particular backing for the paint film is not of substantial importance insofar as the characteristics of the paint formed in accordance with this invention are concerned, the invention has found particular applicability in paint films to be employed on relatively soft fibrous surfaces such as that of a structural insulating fiberboard panel.

It will be understood that the details given herein are for the purpose of illustration, not restriction, and that variations within the spirit of the invention are intended to be included in the scope of the appended claims.

What I claim is:

1. A non-burnishing paint having a 60° specular gloss of less than approximately 10 and a pigment volume of approximately 50 to 70% and having incorporated therein approximately 35 to 65%, by weight of the total pigments, of irregular, fragmentary, mineral particles having a Mohs hardness of at least approximately 3 and a size classification sufficient to allow retention of substantially all particles of Standard 325 mesh, a maximum of approximately 70% through 200 mesh and substantially all to pass 60 mesh.

2. A non-burnishing paint having a 60° specular gloss of less than approximately 10 and a pigment volume of approximately 50 to 70% and having incorporated therein approximately 35 to 65%, by weight of the total pigments, of irregular, fragmentary ground whiting having a Mohs hardness of at least approximately 3 and a size classification sufficient to allow retention of substantially all particles on Standard 325 mesh, a maximum of approximately 70% through 200 mesh and substantially all to pass 60 mesh.

3. A non-burnishing paint having a 60° specular gloss of less than approximately 10 and a pigment volume of approximately 50 to 70% and having incorporated therein at least approximately 35%, by weight of the total pigments, of irregular, fragmentary mineral particles having a Mohs hardness of at least approximately 3 and a size classification sufficient to allow retention of substantially all particles on Standard 325 mesh, a maximum of approximately 70% through 200 mesh and substantially all to pass 60 mesh.

4. A non-burnishing paint having a 60° specular gloss of less than approximately 10 and a pigment volume of approximately 50 to 70% and having incorporated therein approximately 35 to 65%, by weight of the total pigments, of irregular, fragmentary mineral particles having a Mohs hardness of at least approximately 3 and sized to allow retention of substantially all particles on Standard 325 mesh, a maximum of approximately 70% through 200 mesh and substantially all to pass 60 mesh.

5. A non-burnishing protein based, water thinned paint having a 60° specular gloss of less than approximately 10 and a pigment volume of approximately 50 to 70% and having incorporated therein at least approximately 35%, by weight of the total pigments, of irregular, fragmentary, mineral particles having a Mohs hardness of at least approximately 3 and a size classification sufficient to allow retention of substantially all particles on Standard 325 mesh, a maximum of approximately 70% through 200 mesh and substantially all to pass 60 mesh.

6. A non-burnishing protein based, water thinned paint having a 60° specular gloss of less than approximately 10 and a pigment volume of approximately 50 to 70% and having incorporated therein approximately 35 to 65%, by weight of the total pigments, of irregular, fragmentary mineral particles having a Mohs hardness of at least approximately 3 and sized to allow retention of substantially all particles on Standard 325 mesh, a maximum of approximately 70% through 200 mesh and substantially all to pass 60 mesh.

7. A non-burnishing oil modified protein based, water thinned paint having a 60° specular gloss of less than approximately 10 and a pigment volume of approximately 50 to 70% and having incorporated therein at least approximately 35%, by weight of the total pigments, of irregular, fragmentary, mineral particles having a Mohs hardness of at least approximately 3 and a size classification sufficient to allow retention of substantially all particles on Standard 325 mesh, a maximum of approximately 70% through 200 mesh and substantially all to pass 60 mesh.

8. A non-burnishing oil modified protein based, water thinned paint having a 60° specular gloss of less than approximately 10 and a pigment volume of approximately 50 to 70% and having incorporated therein approximately 35 to 65%, by weight of the total pigments, of irregular, fragmentary mineral particles having a Mohs hardness of at least approximately 3 and sized to allow retention of substantially all particles on Standard 325 mesh, a maximum of approximately 70% through 200 mesh and substantially all to pass 60 mesh.

9. A non-burnishing paint having a 60° specular gloss of less than approximately 10 and a pigment volume of approximately 50 to 70% and having incorporated therein at least approximately 35%, by weight of the total pigments, of ground whiting sized to allow retention of substantially all particles on Standard 325 mesh, a maximum of approximately 70% through 200 mesh and substantially all to pass 60 mesh.

10. A non-burnishing protein based, water thinned paint having a 60° specular gloss of less than 10 and a pigment volume of approximately 50 to 70% and having incorporated therein at least approximately 35%, by weight of the total pigments, of ground whiting sized to allow retention of substantially all particles on Standard 325 mesh, a maximum of approximately 70% through 200 mesh and substantially all to pass 60 mesh.

11. A non-burnishing protein based, water thinned paint having a 60° specular gloss of less than 10 and a pigment volume of approximately 50 to 70% and having incorporated therein approximately 35 to 65%, by weight of the total pigments, of ground whiting sized to allow retention of substantially all particles on Standard 325 mesh, a maximum of approximately 70% through 200 mesh, and substantially all to pass 60 mesh.

12. The method of rendering a paint having a 60° specular gloss of less than approximately 10 and a pigment volume of approximately 50 to 70%, non-burnishing which comprises adding and mixing to disperse throughout said paint at least approximately 35%, by weight of the total pigments, of irregular, fragmentary, mineral particles having a Mohs hardness of at least approximately 3 and a size classification sufficient to allow retention of substantially all particles on Standard 325 mesh, a maximum of approximately 70% through 200 mesh and substantially all to pass 60 mesh.

13. The method of rendering a paint having a 60° specular gloss of less than approximately 10 and a pigment volume of approximately 50 to 70%, non-burnishing which comprises adding and mixing to disperse throughout said paint approximately 35 to 65%, by weight of the total pigments, of irregular, fragmentary mineral particles having a Mohs hardness of at least approximately 3 and a size classification sufficient to allow retention of substantially all particles on Standard 325 mesh, a maximum of approximately 70% through 200 mesh and substantially all to pass 60 mesh.

14. The method of rendering a paint having a 60° specular gloss of less than approximately 10 and a pigment volume of approximately 50 to 70%, non-burnishing which comprises adding and mixing to disperse throughout said paint approximately 35 to 65%, by weight of the total pigments, of ground whiting sized to allow retention of substantially all particles on Standard 325 mesh, a maximum of approximately 70% through 200 mesh and substantially all to pass 60 mesh.

15. The method of rendering a protein based, water thinned paint having a 60° specular gloss of less than approximately 10 and a pigment volume of approximately 50 to 70%, non-burnishing which comprises adding and mixing to disperse throughout said paint at least approximately 35%, by weight of the total pigments, of irregular, fragmentary, mineral particles having a Mohs hardness of at least approximately 3 and a size classification sufficient to allow retention of substantially all particles on Standard 325 mesh, a maximum of approximately 70% through 200 mesh and substantially all to pass 60 mesh.

16. The method of rendering a protein based, water thinned paint having a 60° specular gloss of less than approximately 10 and a pigment volume of approximately 50 to 70%, non-burnishing which comprises adding and mixing to disperse throughout said paint approximately 35 to 65%, by weight of the total pigments, of irregular, fragmentary mineral particles having a Mohs hardness of at least approximately 3 and a size classification sufficient to allow retention of substantially all particles on Standard 325 mesh, a maximum of approximately 70% through 200 mesh and substantially all to pass 60 mesh.

17. The method of rendering a protein based, water thinned paint having a 60° specular gloss of less than approximately 10 and a pigment volume of approximately 50 to 70%, non-burnishing which comprises adding and mixing to disperse throughout said paint approximately 35 to 65%, by weight of the total pigments, of ground whiting sized to allow retention of substantially all particles on Standard 325 mesh, a maximum of approximately 70% through 200 mesh and substantially all to pass 60 mesh.

18. The method of rendering an oil modified protein based, water thinned paint having a 60° specular gloss of less than approximately 10 and a pigment volume of approximately 50 to 70%, non-burnishing which comprises adding and mixing to disperse throughout said paint approximately 35 to 65%, by weight of the total pigments, of irregular, fragmentary mineral particles having a Mohs hardness of at least approximately 3 and a size classification sufficient to allow retention of substantially all particles on Standard 325 mesh, a maximum of approximately 70% through 200 mesh and substantially all to pass 60 mesh.

19. A non-burnishing paint having a 60° specular gloss of less than approximately 10 and a pigment volume of approximately 50 to 70% and having incorporated therein approximately 35 to 65%, by weight of the total pigments, of mineral particles having the rhombohedral cleavage characteristics of whiting, a Mohs hardness of at least approximately 3 and sized to allow retention of substantially all particles on Standard 325 mesh, a maximum of approximately 70% through 200 mesh and substantially all to pass 60 mesh.

20. A non-burnishing protein based, water thinned paint having a 60° specular gloss of less than approximately 10 and a pigment volume of approximately 50 to 70% and having incorporated therein approximately 35 to 65%, by weight of the total pigments, of mineral particles having the rhombohedral cleavage characteristics of whiting a Mohs hardness of at least approximately 3 and sized to allow retention of substantially all particles on Standard 325 mesh, a maximum of approximately 70% through 200 mesh and substantially all to pass 60 mesh.

21. A non-burnishing paint having a 60° specular gloss of less than approximately 10 and a pigment volume of approximately 50 to 70% and having incorporated therein approximately 35 to 65%, by weight of the total pigments, of mineral particles comprising extender pigments selected from the group consisting of whiting and silica and mixtures thereof having a size classification sufficient to allow retention of substantially all particles on Standard 325 mesh, a maximum of approximately 70% through 200 mesh and substantially all to pass 60 mesh.

22. A non-burnishing paint having a 60° specular gloss of less than approximately 10 and a pigment volume of approximately 60 to 70% and having incorporated therein approximately 35 to 65%, by weight of the total pigments, of mineral particles comprising extender pigments selected from the group consisting of whiting and silica and mixtures thereof, said mineral particles having a Mohs hardness of at least approximately 3 and sized to allow retention of substantially all particles on Standard 325 mesh, a maximum of approximately 70% through 200 mesh and substantially all to pass 60 mesh.

23. A non-burnishing protein based, water thinned paint having a 60° specular gloss of less than approximately 10 and a pigment volume of approximately 60 to 70% and having incorporated therein approximately 35 to 65%, by weight of the total pigments, of mineral particles comprising extender pigments selected from the group consisting of whiting and silica and mixtures thereof, said mineral particles having a Mohs hardness of at least approximately 3 and sized to allow retention of substantially all particles on Standard 325 mesh, a maximum of approximately 70% through 200 mesh and substantially all to pass 60 mesh.

References Cited in the file of this patent

UNITED STATES PATENTS

| | | |
|---|---|---|
| 2,260,826 | Booge | Oct. 28, 1941 |
| 2,572,252 | Erasmus et al. | Oct. 23, 1951 |
| 2,713,545 | Kather | July 19, 1955 |

OTHER REFERENCES

Mattiello: Protective and Decorative Coatings, vol. III, pages 341 and 342.

Sabin: Technology of Paint and Varnish, 3rd Ed. (1924), page 165.

Heaton: Outlines of Paint Technology, (1928), page 107.

Heaton: Outline of Paint Tehcnology, 3rd Ed. (1947), page 99.

Wampler: Modern Organic Finishes (1946), pages 4–6.

Von Fischer: Paint and Varnish Technology (1948), pages 60 and 61.

Siesholtz et al.: Industrial and Engineering Chemistry, vol. 41, No. 2 (February 1949), pages 390 to 395.

Sutermeister et al.: "Casein and Its Industrial Applications," 2nd Edition (1939), pages 322–325.